though2,758,106
Patented Aug. 7, 1956

2,758,106

IMPROVEMENTS IN THE PRODUCTION OF POLY-MERISATION PRODUCTS USING REDOX CATA-LYSTS

Hellmut Bredereck and Erich Bäder, Stuttgart, and Adolf Wohnhaas, Grunbach/Remstal, Germany, assignors to W. C. Heraeus G. m. b. H., Hanau (Main), Germany, and Deutsche Gold- und Silber-Scheideanstalt vormals Roessler, Frankfurt am Main, Germany No Drawing. Application March 4, 1952,
Serial No. 274,821

Claims priority, application Germany March 6, 1951

1 Claim. (Cl. 260—89.5)

This invention relates to a process for the production of polymerisation products. In order to reduce the polymerisation temperature and increase the polymerisation velocity in the polymerisation of unsaturated organic compounds such as unsaturated hydrocarbons, vinyl compounds, acrylic compounds, styrenes and allyl compounds, various redox systems have already been proposed as catalysts. Redox systems are to be understood as meaning combinations of compounds having a reducing and oxidising effect, such, for example, as are formed by tertiary amines or sulphinic acids in the presence of air or in combination with inorganic or organic per-compounds. These systems have already been used for accelerating polymerisation (cf. W. Kern, Makromelekulare Chemie, Bd. 1 (1948), page 209 et seq., and Angewandte Chemie (1949), pages 471–474). This provided a solution for the first time to various problems which had for a long time been met with in practice. For example, it was possible to make self-hardening polymerisation materials for dental prothesis which hardened even at room temperature.

The present invention is based on the equally surprising and important discovery that the effectiveness of redox systems as polymerisation accelerators can be further considerably increased by adding monohydric alcohols to the systems.

According to the present invention, polymerisable organic compounds with a doubly linked terminal methylene group are polymerised in the presence of redox systems as polymerisation accelerators with addition of monohydric alcohols. This accelerates the polymerisation considerably. The reduction times are often reduced to a fraction of the times required without this addition.

The monohydric alcohols to be employed are, in particular, primary and secondary alcohols, for example methanol, ethanol, propanol, isopropanol, butanol, hexanol and benzyl alcohol. It is important that the alcohols should dissolve in the monomeric material to be polymerised. The action of the alcohols is probably due to the fact that they are incorporated in the redox system.

The addition of the alcohols to the catalytically effective redox systems has proved effective in the polymerisation of the most varied organic compounds with a doubly linked terminal methylene group, for example unsaturated hydrocarbons of aliphatic or aromatic character which may be as low in molecular weight as ethylene, derivatives of vinyl alcohol, allyl compounds, acrylic acid and alkylacrylic acids, for example methacrylic acid, as well as derivatives thereof such as amines, nitriles, chlorides, ethers or esters, especially methyl methacrylate.

The catalytically effective redox systems may be selected from a wide range. Preferably, however, use is made of tertiary amines, sulphinic acids and salts thereof, sulphonamines, sulphocarbinols and mixtures of these compounds, in all cases in the presence of air or peroxide.

The process of the invention has proved particularly effective when tertiary amines are used as reduction components in the redox system, for example, aliphatic, aromatic, or mixed aliphatic-aromatic tertiary amines, as well as derivatives of hydrazine. Certain catalysts recently discovered by one of the assignee companies have proved particularly effective for the invention, namely, arylalkyldialkylamines, for example phenylethyldibutylamine, $C_6H_5.CH_2.CH_2.N(C_4H_9)_2$ and phenylbutyldibutylamine, $C_6H_5.CH_2.CH_2.CH_2.CH_2.N(C_4H_9)_2$, or tertiary alkanolamines such as mono- or di-ethanolamines containing alkyl groups, for example dibutylmono-ethanolamines, butyldiethanolamines and trialkylanolamines.

Nitrogen containing compounds in which at least one hydrogen atom linked to the nitrogen has been replaced by a residue of the general formula:

can be used with good results as components of the redox systems. In the above general formula R represents a desired organic, especially aromatic, residue, and R' and R" represent hydrogen or a hydrocarbon residue which may, if desired, be substituted. These compounds have already been proposed by the same applicants. We prefer the secondary and tertiary amines with residues of this kind, for example compounds such as $(CH_3.C_6H_4.SO_2.CH_2)_2NH$ or $(C_6H_{13}.SO_2.CH_2)_2NCH_3$, which are obtained by mixing a sulphinic acid with formaldehyde and reacting the hydroxyl compound thus obtained with the corresponding amine.

Finally, sulphinic acids and salts thereof should be mentioned for the redox systems which act as polymerisation accelerators, especially the salts of sulphinic acids with organic bases proposed by the assignee companies, especially the salts of primary and secondary amines which have a high catalytic effectiveness and are distinguished from the sulphinic acids themselves by excellent permanence. For the oxidation components of the redox systems employed according to the invention, use is made of substances such as organic per-compounds, for example dibenzoyl peroxide or p-chlorbenzoyl peroxide, assuming that the admission of oxygen or air does not suffice for this purpose or that the substances mentioned as reduction components, because of their molecular structure or their occurrence in two tautomeric forms, do not make the addition of a separate oxidation component superfluous.

In accordance with the varied nature of the substances to be polymerised and of the redox systems and the multiplicity of possible uses, the alcohols are added in varied manners, for example are added to the whole of the polymerisation material or when monomeric compounds are to be polymerised are added in the presence of polymers and monomers, or are subsequently added by themselves. There are similar possible modes of addition of the redox system or its two components.

The process of the invention is primarily suitable for block polymerisation but can also be applied to solution polymerisation, emulsion polymerisation and suspension polymerisation. In the case of block polymerisation the invention has proved particularly valuable in a process in which the monomeric liquid to be polymerised is mixed with the previously completely polymerised product, which may be present, for example, in powder form, and the self-hardening mass is then polymerised completely to give the finished moulded body.

The advance made by the invention consists principally, as already mentioned, in further shortening the polymerisation period. Thus, for example, it is possible in dental work to produce self-hardening synthetic resin masses which satisfy every wish as regards speed of hardening. A further considerable advantage of the new process consists in that in many cases the polymerisation can be completed better than hitherto. Thus, for example, when methyl methacrylate is polymerised in the presence of the above-mentioned tertiary amines and benzoyl peroxide as the redox system with the addition of ethyl alcohol, the end product immediately after the polymerisation no longer gives off any smell of the monomeric starting material.

The following examples illustrate the accelerating effect of the alcohol addition:

Example 1

1.5 cc. of monomeric methyl methacrylate (stabilized with hydroquinone) and 2 to 3 gm. of polymeric methyl methacrylate containing 4% of benzoyl peroxide, are polymerised in the presence of 0.08 to 0.1 gm. of polymerisation accelerator. The polymerisation period, beginning at room temperature, was determined in the absence of methanol and in the presence of an addition of 0.2 cc. of methanol. The results may be seen from the following table:

| Polymerisation accelerator | Period in min. without methanol | Period in min. with methanol |
|---|---|---|
| N-Methyl-di-(p-tolyl-sulpho-methyl)-amine. $(H_3C.C_6H_4.SO_2.CH_2)_2NCH_3$ | 23–25 | 5 |
| N-Ethyl-di-(p-tolyl-sulpho-methyl)-amine. $(H_3C.C_6H_4.SO_2.CH_2)_2N.C_2H_5$ | 13–14 | 5 |
| Di-(octyl-sulpho-methyl)-amine. $(C_8H_{17}.SO_2.CH_2)_2NH$ | Several hours | 7 |
| N-Methyl-di-(octyl-sulpho-methyl)-amine. $(C_8H_{17}.SO_2.CH_2)_2NCH_3$ | 15 | |

Example 2

The polymerisation of a mixture of monomeric methyl methacrylate with polymeric methyl methacrylate according to Example 1 was carried out with the addition of various polymerisation accelerators with the further addition of 0.1 cc. of ethanol, with the following results:

| Polymerisation accelerator | Period in min. without ethanol | Period in min. with ethanol |
|---|---|---|
| Dimethylaniline | 9–10 | 6–7 |
| Diethylaniline | 30 | 13–14 |
| N-Ethyl-di-(p-tolyl-sulpho-methyl)-amine. $(H_3C.C_6H_4.SO_2.CH_2)_2N.C_2H_5$ | 13–14 | 7.5 |
| The salt of dibutylamine with p-tolyl-sulphinic acid. $[H_3C.C_6H_4.SO_2H][HN(C_4H_9)_2]$ | 12–13 | 8.5 |

Example 3

With the same polymerisation additions and polymerisation conditions as in Example 1, the effect of various alcohols was investigated, using n-ethyl-di-(p-tolyl-sulpho-methyl)-amine $(H_3C.C_6H_4.SO_2.CH_2)_2N.C_2H_5$. Without additions of alcohol the polymerisation period was 13 to 14 minutes at room temperature.

| Alcohol | 6% alcohol, Polymerisation period in mins. | 16% alcohol, Polymerisation period in mins. |
|---|---|---|
| Methanol | 6.5–7 | 5 |
| 95% Ethanol gelled with petroleum ether | 7.5–8 | 6.5–7 |
| Absolute ethanol | 8 | 7 |
| n-Propanol | | 9 |
| Isopropanol | | 8.5–9 |
| n-Butanol | | 9.5 |
| n-Hexanol | | 11–12 |
| Benzyl alcohol | 9.5–10 | |

The process of the invention and the polymerisation materials which are produced thereby may be applied in the most varied fields and for manifold purposes. Accordingly, prior to, during, or after the polymerisation, additional substances are added to the products, for example the most varied fillers such as carbon black, highly dispersed metal oxides such as zinc oxide, silicon dioxide, aluminium oxide, and other finely dispersed or surface active substances, vulcanising agents such as sulphur, mercaptobenzthiazole or urotropin, vulcanisation accelerators, dyestuffs, pigments, loading agents, air-drying oils, plasticisers, stabilisers, capillary active substances, etc.

The process of the invention is of value in the lacquer, adhesive and surface coating industry. In the case of a syrupy lacquer to be polymerised according to the invention which consists of a solution of the polymer in the monomer with the addition of a redox system and a primary or secondary alcohol, a film formed by painting or spraying on to a surface solidifies or hardens very rapidly. The process of the invention is also suitable for the production of masses to be applied by means of a spatula, impregnating masses for materials of all kinds, for example fabrics, especially textiles, joint-packing masses and pore fillers, for the production of bodies or claddings which are to be resistant against chemical attack or atmospheric influences, for electrical insulators of all kinds, heat and sound insulating materials and modelling and imprint-receiving masses.

Moulded bodies according to the invention, of various kinds can be made, of properties varying from rubber-like to glass-like. Since the new polymerisation products can be made free from pores and tension they can be employed with advantage for the production of articles in which optical clearness or transparency is necessary, such as safety glass, protective filters and spectacle lenses.

The moulded bodies according to the process of the invention are produced in the most varied forms, for example threads, films, tubes, hoses, balls and bodies of complicated structure.

As already mentioned, the process of the invention is of importance in the dental field, for example for the production of prothesis, artificial teeth and tooth and root fillings. Preferably true to shape pieces are produced in that the monomeric or only partially polymerised liquid is introduced into the mould in admixture with a preferably pulverulent polymer, especially one which corresponds to the compound to be polymerised, and is completely polymerised in the mould to give the finished moulded article. The liquid component and the powder component are preferably stored separately until the polymerisation is effected.

Because of the considerable shortening of the hardening period and the possibility of effecting polymerisation at relatively low temperatures, the process of the invention is of particular importance for prothetic work in the mouth itself and for tooth fillings.

The process of the invention can be applied with advantage in other prothetic fields outside the dental field.

What we claim is:

Process for the polymerization of methyl methacrylate which comprises mass polymerizing monomeric methyl methacrylate in the presence of polymethyl methacrylate with a catalyst comprising a member selected from a first group consisting of tertiary amines and secondary sulfone amines and a member of a second group consisting of air and peroxides in the presence of a nonpolymerizable monohydroxy alcohol selected from the group consisting of lower alkanols and benzyl alcohol as an accelerator and recovering the polymerization product formed.

References Cited in the file of this patent

UNITED STATES PATENTS

| | | |
|---|---|---|
| 2,333,635 | Britton et al. | Nov. 9, 1943 |
| 2,450,000 | Howk et al. | Sept. 28, 1948 |
| 2,546,220 | Fryling et al. | Mar. 27, 1951 |
| 2,560,694 | Howard et al. | July 17, 1951 |
| 2,566,821 | Brown et al. | Sept. 4, 1951 |
| 2,584,773 | Reynolds et al. | Feb. 5, 1952 |
| 2,647,878 | Lee | Aug. 4, 1953 |